United States Patent
Sato et al.

(10) Patent No.: US 9,926,156 B2
(45) Date of Patent: Mar. 27, 2018

(54) SHEET SIZE SPECIFICATION SYSTEM, SHEET SIZE SPECIFICATION METHOD, COMPUTER-READABLE STORAGE MEDIUM STORING SHEET SIZE SPECIFICATION PROGRAM, AND IMAGE FORMING DEVICE

(71) Applicant: Konica Minolta, Inc., Chiyoda-ku, Tokyo (JP)

(72) Inventors: Ryuji Sato, Toyohashi (JP); Hiroshi Mizuno, Aisai (JP); Satoshi Fujii, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/200,239

(22) Filed: Jul. 1, 2016

(65) Prior Publication Data

US 2017/0001821 A1    Jan. 5, 2017

(30) Foreign Application Priority Data

Jul. 1, 2015 (JP) .................................. 2015-132731

(51) Int. Cl.
*B65H 1/04* (2006.01)
*B65H 7/14* (2006.01)
(Continued)

(52) U.S. Cl.
CPC ................. *B65H 7/14* (2013.01); *B65H 1/04* (2013.01); *G03G 15/5029* (2013.01); *G03G 15/5083* (2013.01); *G03G 15/6514* (2013.01); *G06K 9/00442* (2013.01); *G06K 9/52* (2013.01); *G06T 7/60* (2013.01); *G06T 7/70* (2017.01);
(Continued)

(58) Field of Classification Search
CPC .. B65H 7/14; B65H 1/04; B65H 2405/11425; G06T 7/70; G06T 7/60; G06T 2207/30176; H04N 5/2257; G06K 9/00442; G06K 9/52; G03G 15/5029; G03G 15/5083; G03G 15/6514
See application file for complete search history.

(56) References Cited

U.S. PATENT DOCUMENTS 9,274,480 B1 * 3/2016 Wynn ................ G03G 15/5029
2006/0250432 A1 * 11/2006 Lapstun ..................... B41J 3/36
347/16

(Continued)

FOREIGN PATENT DOCUMENTS

JP    07253735 A    10/1995
JP    2005041678 A    2/2005

*Primary Examiner* — David H Bollinger
(74) *Attorney, Agent, or Firm* — Cantor Colburn LLP

(57) ABSTRACT

A sheet size specification system for specifying size of a sheet on a sheet stacking tray of an image forming device, by using an image capture unit of a portable terminal. The system includes an analyzer and a size specifier. The analyzer analyzes image data captured by the image capture unit, the image data indicating the sheet stacking tray and the sheet thereon. The size specifier acquires, from the analyzed image data, first position data indicating positions of predefined feature points of the sheet stacking tray and second position data indicating positions of an outline of the sheet, and specifies size of the sheet on the sheet stacking tray based on the first position data and the second position data.

19 Claims, 15 Drawing Sheets

(51) Int. Cl.
*G03G 15/00* (2006.01)
*G06K 9/00* (2006.01)
*G06K 9/52* (2006.01)
*G06T 7/60* (2017.01)
*H04N 5/225* (2006.01)
*G06T 7/70* (2017.01)

(52) U.S. Cl.
CPC . *H04N 5/2257* (2013.01); *B65H 2405/11425* (2013.01); *G06T 2207/30176* (2013.01)

(56) References Cited

U.S. PATENT DOCUMENTS

| | | | | |
|---|---|---|---|---|
| 2014/0268196 | A1* | 9/2014 | Young | B65H 5/00 358/1.12 |
| 2014/0362248 | A1* | 12/2014 | Ishida | H04N 5/23293 348/222.1 |
| 2015/0336759 | A1* | 11/2015 | Tsuyuki | B65H 1/04 271/258.01 |
| 2016/0083209 | A1* | 3/2016 | Kimura | B65H 7/10 271/248 |
| 2016/0187826 | A1* | 6/2016 | Mamura | G03G 15/5029 399/45 |

\* cited by examiner

SHEET SIZE SPECIFICATION SYSTEM, SHEET SIZE SPECIFICATION METHOD, COMPUTER-READABLE STORAGE MEDIUM STORING SHEET SIZE SPECIFICATION PROGRAM, AND IMAGE FORMING DEVICE

CROSS REFERENCE TO RELATED APPLICATIONS

The present invention claims priority under 35 U.S.C. § 119 to Japanese Application No. 2015-132731 filed Jul. 1, 2015, the entire content of which is incorporated herein by reference.

BACKGROUND OF THE INVENTION

Field of the Invention

The present invention relates to sheet size specification systems, sheet size specification methods, computer-readable storage mediums that store sheet size specification programs, and image forming devices that specify sheet size of sheets set on sheet stacking trays of image forming devices.

Related Art

In recent years there has been a strong demand for cost reduction in the field of image forming devices, and therefore it is desirable to reduce the number of parts as much as possible.

Thus, reducing the number of parts such as sensors and harnesses has been considered, and one option is omitting a sheet size detection sensor at a sheet stacking tray for a paper feed.

However, if a sheet size detection sensor is omitted, a user must directly input, via an operation panel, the sheet size of sheets on the sheet stacking tray. If the user measures the sheet size by using a scale, for example, a great deal of time and effort is required. If the user judges the sheet size by eye, then mistakes in input may easily occur.

Thus, for example, in JP H7-253735, a configuration is disclosed in which an image forming device is a photocopier, and sheets are scanned by a scanner to detect sheet size.

However, according to JP H7-253735, in addition to the problem of the labor involved in removing a sheet from the sheet stacking tray and scanning it, the configuration cannot be implemented when an image forming device is specialized as a printer.

SUMMARY OF THE INVENTION

The present invention has been achieved in view of the above technical problems and aims to provide a sheet size specification system a sheet size specification method, and a computer-readable storage medium storing a sheet size specification program, which can easily specify size of a sheet on a sheet stacking tray by using a general-purpose portable terminal, and an image forming device that is applicable for use in the sheet size specification system.

To achieve at least one of the above-mentioned aims, a sheet size specification system reflecting one aspect of the present invention is for specifying size of a sheet on a sheet stacking tray of an image forming device by using an image capture unit of a portable terminal, the system comprising: an analyzer that analyzes image data captured by the image capture unit, the image data indicating the sheet stacking tray and the sheet thereon; and a size specifier that acquires, from the analyzed image data, first position data indicating positions of predefined feature points of the sheet stacking tray and second position data indicating positions of an outline of the sheet, and specifies size of the sheet on the sheet stacking tray based on the first position data and the second position data.

The image forming device preferably has a storage that stores, in association with the sheet stacking tray, sheet size data specified by the size specifier.

Furthermore, the analyzer and the size specifier may be included in the portable terminal.

Furthermore, the analyzer and the size specifier may be included in the image forming device, and the portable terminal preferably transmits image data of the sheet stacking tray to the image forming device and the image forming device preferably performs analysis and sheet size specification by using received image data.

Furthermore, the portable terminal preferably includes: an attitude angle detector that detects an attitude angle of the portable terminal; and a first prohibiting unit that prevents the image capture unit from capturing an image of the sheet stacking tray when an angle of tilt of the portable terminal relative to the sheet stacking surface is determined to be outside a predefined range.

Furthermore, the sheet stacking tray preferably has a pair of guide members that are moveable in a direction perpendicular to a sheet transport direction, which regulate sheet placement by contacting edges of the sheet on the sheet stacking tray in the direction perpendicular to the sheet transport direction, the system further comprising: an acquisition unit that acquires a distance between guide surfaces of the guide members; and a warning unit that prompts resetting of the sheet when the distance between the guide surfaces of the guide members is at least a predefined amount greater than a distance between the edges of the sheet.

Furthermore, a plurality of first markers are preferably disposed in positions on a sheet stacking surface of the sheet stacking tray that can be captured by the image capture unit even when the sheet is on the sheet stacking tray and the sheet is a largest sheet size processable by the image forming device.

Furthermore, the portable terminal preferably includes a device data acquirer that acquires device data, the device data including data indicating distances between the predefined feature points of the sheet stacking tray, and the size specifier preferably specifies size of the sheet on the sheet stacking tray based on the device data and a relative positional relationship between the first position data and the second position data.

Furthermore, the size specifier preferably specifies sheet size by using specific points of the outline of the sheet stacking tray as the predefined feature points.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

The following describes, as an embodiment of the present invention, a sheet size specification system that specifies sheet size of sheets stacked on a manual feed tray of a multifunction peripheral (MFP) by using a capture function of a portable terminal.

(1) Overall Configuration of Sheet Size Specification System

Figure 1:
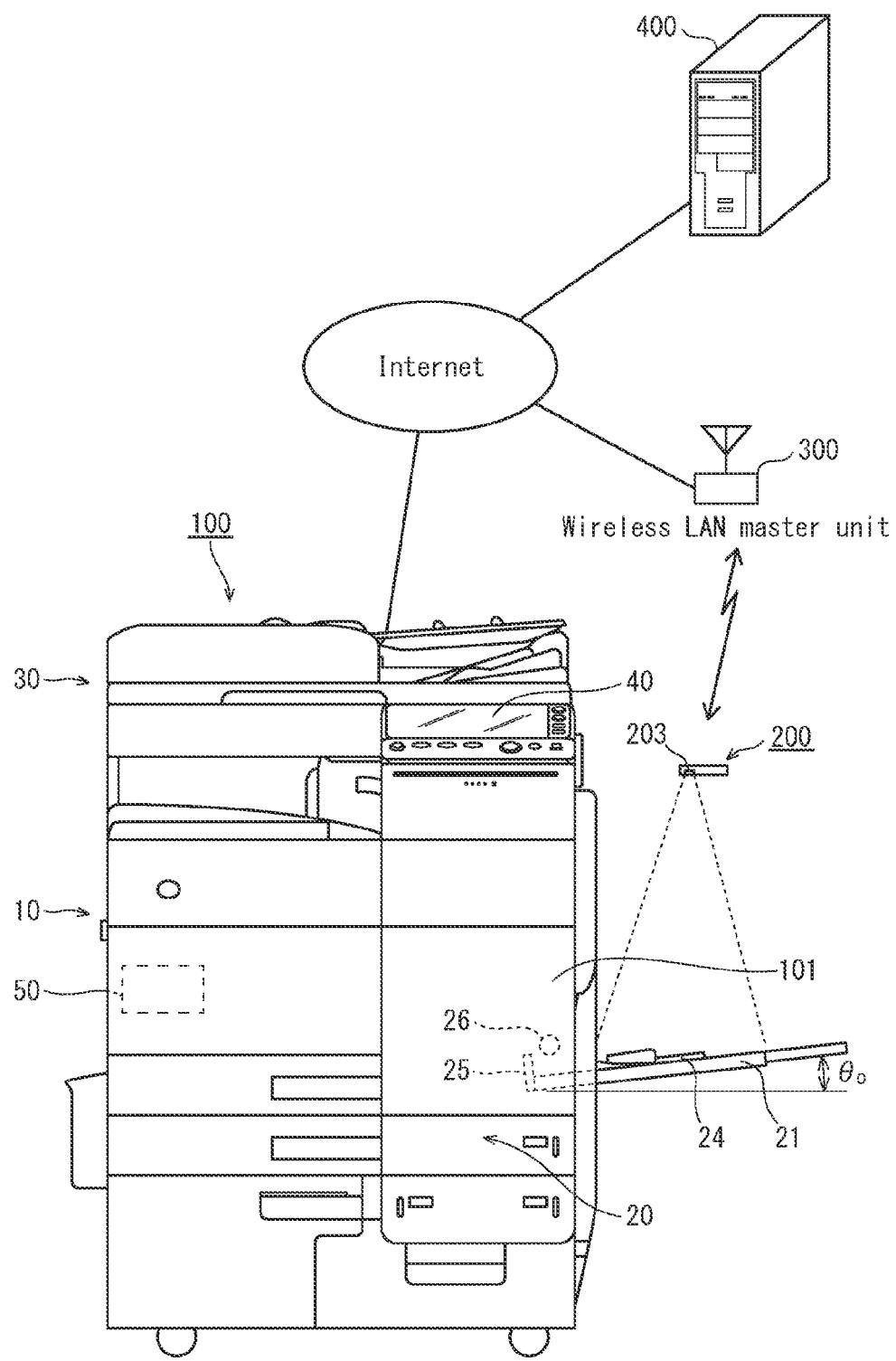
FIG. 1 illustrates an overall configuration of a sheet size specification system pertaining to an embodiment of the present invention.

FIG. 1 illustrates an overall configuration of a sheet size specification system pertaining to an embodiment of the present invention.

An MFP 100 is connected to the internet by a wired LAN. A portable terminal 200 is connected to the internet via Wi-Fi and a wireless LAN master unit 300, allowing the MFP 100 and the portable terminal 200 to communicate.

As the portable terminal 200, a typical general-purpose smartphone, tablet PC, etc., is used. Even if the location of the MFP 100 does not allow for Wi-Fi connection via the wireless LAN master unit 300, a smartphone may connect to the internet via a wireless communication standard such as 3G or LTE.

In FIG. 1, 400 indicates a server connected to the internet. The server 400 may be a cloud server provided by the maker of the MFP 100 or the portable terminal 200.

The MFP 100 includes a printer 10, a sheet feeder 20, a scanner 30, and a controller 50 as main components thereof. The MFP 100 is an "in-body paper ejection type" that uses a space between the printer 10 and the scanner 30 as an ejection tray. An operation panel 40 is provided to an upper portion of the printer 10.

The MFP 100 accepts print job execution instructions from an external terminal via a LAN, and has a function of executing printing. The MFP 100 also accepts scan, copy, fax, etc., job execution instructions via the operation panel 40 and executes these job execution instructions.

The scanner 30 picks up and transports documents by using an automatic document feeder (ADF), one sheet at a time, reads images of the documents and generates image data.

The printer 10 prints images on sheets transported from the sheet feeder 20, based on image data read by the scanner 30 or image data transmitted with a print job from an external terminal.

The sheet feeder 20 transports sheets one at a time to the printer 10 at measured timings, the sheets being stored in a paper cassette in a body 101 of the MFP 100 or stacked on the manual feed tray 21, which is tiltable and external to the body 101.

The controller 50 centrally controls the printer 10, the sheet feeder 20, the scanner 30, etc. Further, as described later, sheet size setting is performed by acquiring the size of a sheet on the manual feed tray 21 via communication with the portable terminal 200, and saving the size in internal memory in association with the manual feed tray 21.

The manual feed tray 21 can be housed in a concavity (not illustrated) of the body 101 by raising the manual feed tray 21 in a vertical direction about a pivot (not illustrated). When lowered as illustrated in FIG. 1, the manual feed tray 21 is supported at an angle $\theta_0$ from the horizontal direction.

An end of the manual feed tray 21 downstream in a feed direction (sheet transport direction) is inside the body 101. The end is in contact with a regulating plate 25 and sheets are set on a stacking surface of the manual feed tray 21.

A portion of the sheet stacking surface in the vicinity of the regulating plate 25 has a swingable plate (not illustrated) that can swing up and down. When a sheet on the manual feed tray 21 is fed to the printer 10, the swingable plate is swung upwards so that an uppermost sheet in a sheet stack is in contact with a pick-up roller 26, and the sheet is transported to a transport path by rotation of the pick-up roller 26.

As long as the portable terminal 200 can communicate with the MFP 100 and the server 400 via wireless LAN, etc., and is equipped with an image capture function, any model of portable terminal may be used. Each user may use a portable terminal owned by the user.

Figure 2:
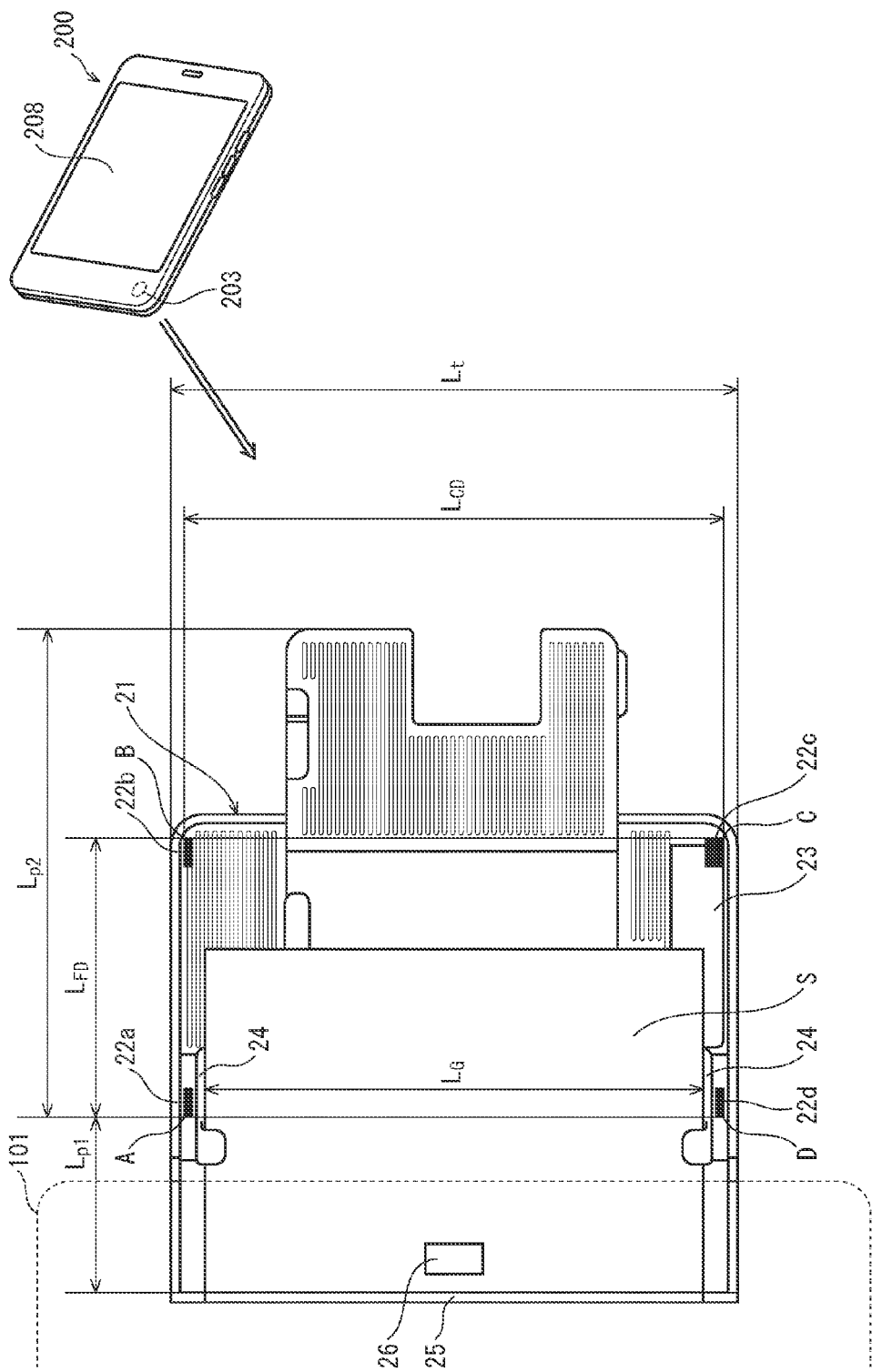
FIG. 2 illustrates capturing of a manual feed tray by using a portable terminal.

FIG. 2 illustrates a sheet S on the manual feed tray 21 to be image-captured, and the portable 200 held above the manual feed tray 21 by a user.

In FIG. 2, for clarity, the fingers, etc., of the user holding the portable terminal 200 are not illustrated. Further, in FIG. 2, the entirety of the manual feed tray 21 is drawn in solid lines, but in actual implementation the portion of the manual feed tray 21 provided with the regulating plate 25 (end portion) is hidden in the body 101 and cannot be image-captured.

The manual feed tray 21 is provided with a pair of guide members 24 that can be slid symmetrically in a width direction of the sheet S, which regulates the position of the sheet S in the width direction (direction perpendicular to the feed direction).

After a user has stacked the sheet S on the manual feed tray 21 with a feed direction end of the sheet S in contact with the regulating plate 25 in the MFP 100, the sheet S is aligned and positioned in the width direction thereof by the pair of guide members 24 in contact with both ends of the sheet S in the width direction.

At four locations on an upper surface 23 of the manual feed tray 21 are four red markers 22a, 22b, 22c, 22d (first markers). The markers 22a, 22b, 22c, 22d are formed at four corners of a rectangle of distance $L_{FD}$ in the feed direction and distance $L_{CD}$ in the width direction. Each vertex of the rectangle, i.e., the vertex of each marker that is farthest from other markers, is used as a feature point A, B, C, D in trapezoidal correction in image analysis, which is described later.

Each of the markers 22a, 22b, 22c, 22d is positioned to be possible to image-capture even when a sheet of a maximum width usable by the MFP 100 is on the manual feed tray 21 and the guide members 24 are in position.

The marker 22c at the bottom right of FIG. 2 has a different shape to the other markers 22a, 22b, 22d and this allows the direction of the manual feed tray 21 to be identified in a captured image. It is sufficient that the marker 22c can be distinguished from other markers, and therefore if a capture unit 203 has a color capture function the marker 22c may be a different color and a different shape from other markers, or may be a different color from and the same shape as other markers.

The portable terminal 200 has the capture unit 203. After image analysis of an image of the manual feed tray 21 and a sheet thereon, captured by the capture unit 203, the size of the sheet is specified and the controller 50 of the MFP 100 is notified of the size. Details are provided later.

(2) Configuration of Electronic Circuit System of MFP 100 and Portable Terminal 200

Figure 3:
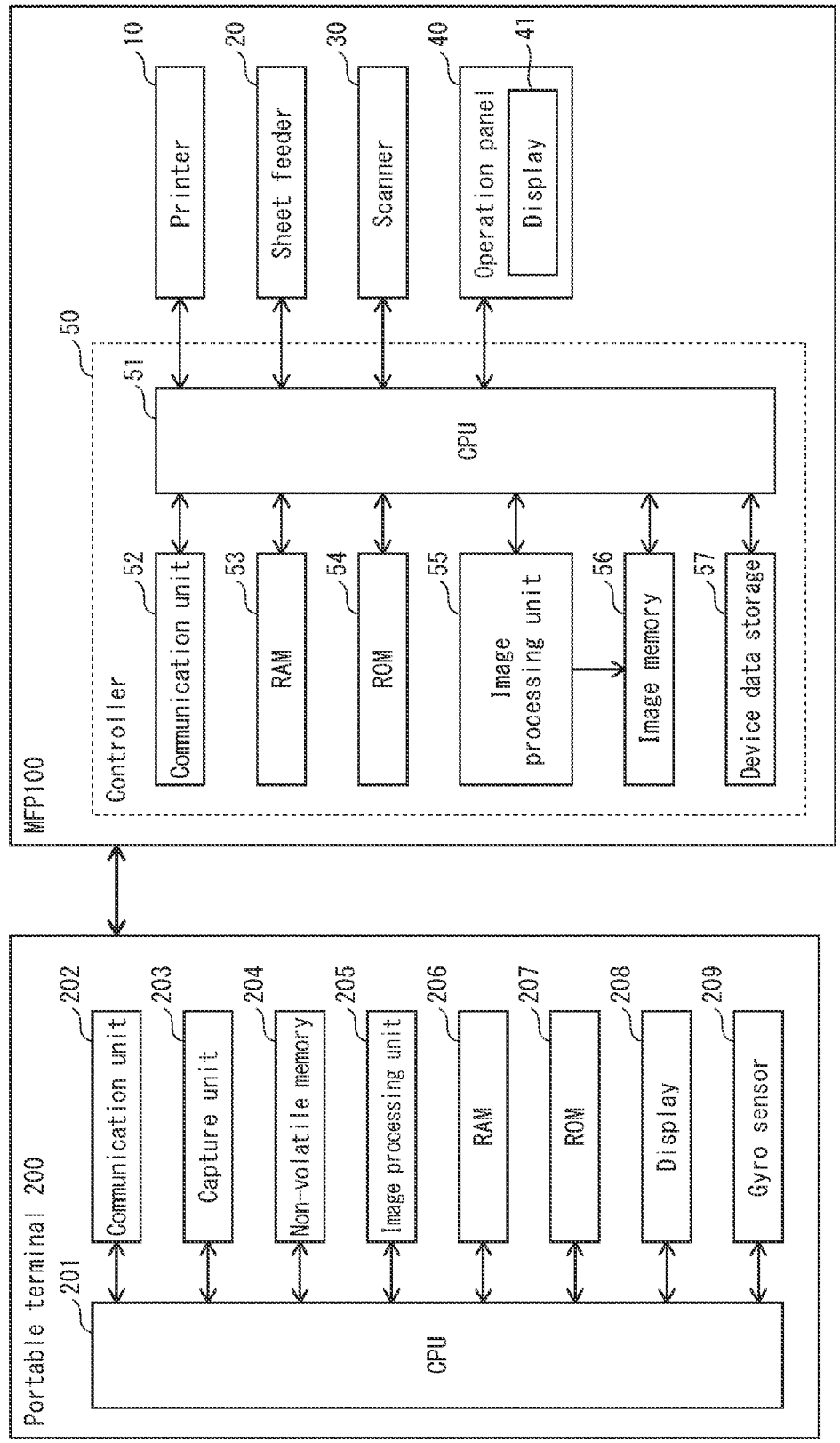
FIG. 3 is a block diagram illustrating electronic circuit systems of a portable terminal and a multi-function peripheral (MFP)

FIG. 3 is a block diagram illustrating electronic circuit systems of the MFP 100 and the portable terminal 200.

The portable terminal 200 comprises a CPU 201, a communication unit 202, the capture unit 203, a non-volatile memory 204, an image processing unit 205, a RAM 206, a ROM 207, a display 208, and a gyro sensor (attitude angle detector) 209.

The communication unit 202 connects to a wireless LAN and performs data communication, and connects to telephone communication lines.

The capture unit 203 is a conventionally-known unit comprising a drive circuit, a focus lens, and solid-state imaging elements such as a CCD image sensor.

The non-volatile memory 204 comprises EEPROM, flash memory, or similar, and stores image data captured by the capture unit 203 and application programs downloaded from the server 400 over the internet.

The image processing unit 205 performs image analysis including image processing such as correction of trapezoidal distortion (trapezoidal correction) of image data captured and edge enhancement processing.

The RAM 206 provides a work area for the CPU 201 to execute programs.

The ROM 207 stores basic programs for operation of the portable terminal 200.

The display 208 comprises a liquid crystal display panel and a liquid crystal panel drive unit, and displays images. Further, the surface of the liquid crystal display panel is provided with a touch panel that allows various input instructions to be performed via touch operations.

Figure 6:
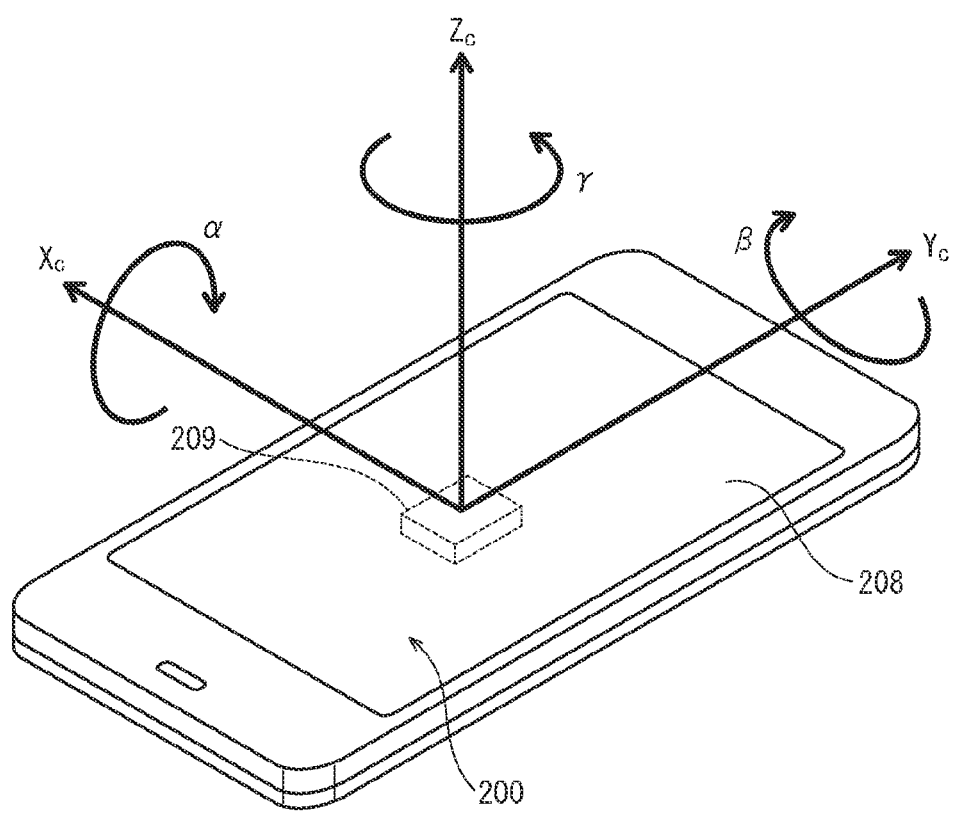
FIG. 6 illustrates attitude angles in three axial directions of the portable terminal, as detected by a gyro sensor of the portable terminal.

The gyro sensor 209 is a conventionally-known sensor that detects rotation angles about three axial directions Xc, Yc, Zc, as illustrated in FIG. 6, detects attitude angles of the portable terminal 200, and notifies the CPU 201 of the results of detection.

The controller 50 of the MFP 100 comprises a CPU 51, a communication unit 52, a RAM 53, a ROM 54, an image processing unit 55, an image memory 56, and a device data storage 57.

The communication unit 52 is connected to the internet via a wired LAN and communicates data.

The RAM 53 provides a work area for the CPU 51 to execute programs for image forming. The ROM 54 stores programs required for operation of the MFP 100.

The image processing unit 55 converts RGB image data into YMCK image data. The RGB data is read from a document by the scanner 30 or included in a print job received from an external terminal via the communication unit 52. Y, M, C, and K represent developer colors yellow, magenta, cyan, and black, respectively. The image processing unit 55 performs processing such as smoothing, edge enhancement, γ correction, etc., on the image data as required, and stores the resulting image data in the image memory 56.

The device data storage 57 comprises a non-volatile memory, and stores device data of the MFP 100 such as data regarding distances between markers on the manual feed tray in association with information about the device model.

The CPU 51 reads programs stored in the ROM 54 and executes operations such as print operations and copy operations.

(3) Sheet Size Acquisition

The following describes sheet size acquisition processing in which the capture unit 203 of the portable terminal 200 is used to automatically acquire the sheet size of the sheet S on the manual feed tray 21 of the MFP 100.

Figure 4:
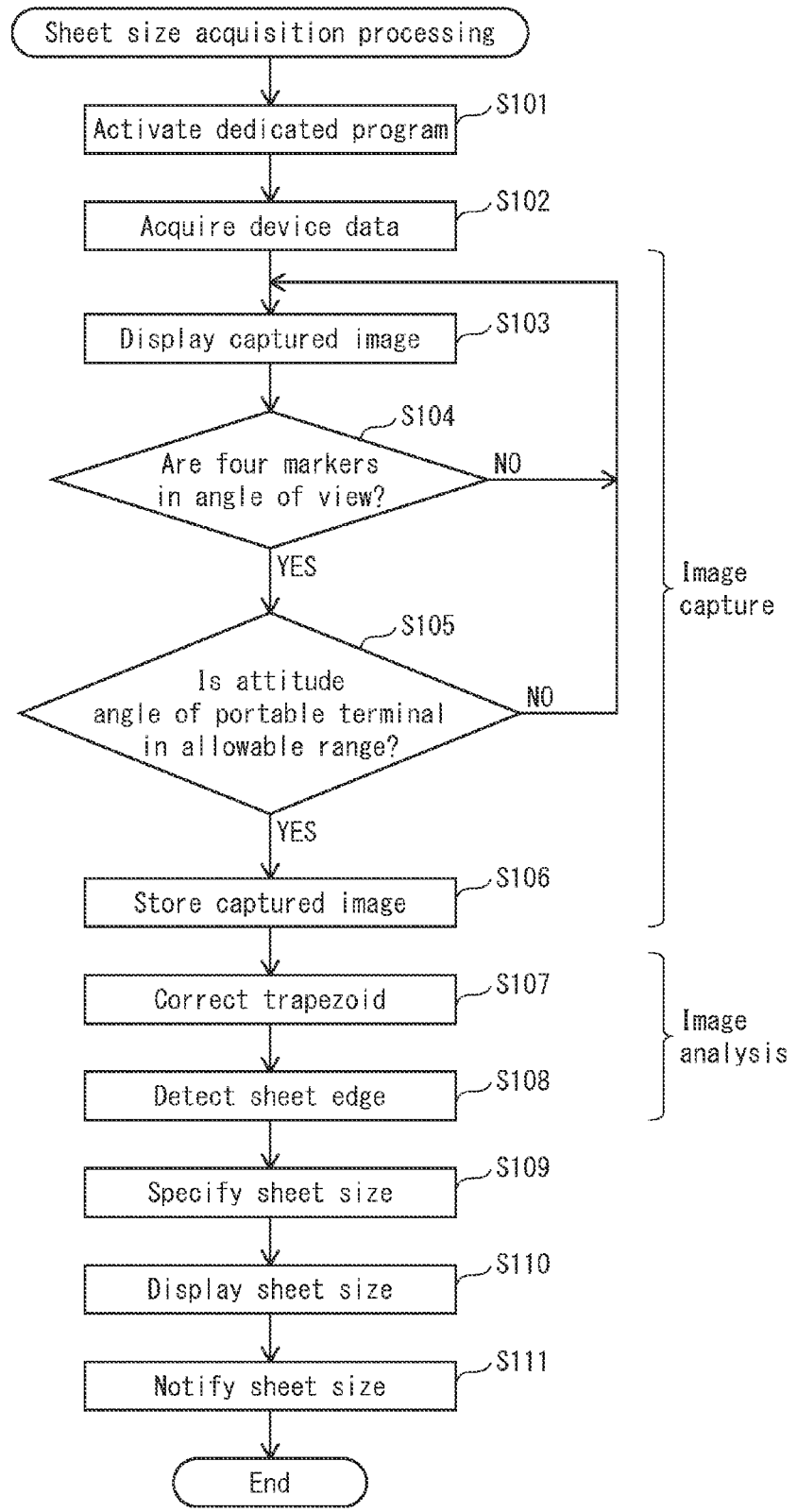
FIG. 4 is a flowchart illustrating a procedure of sheet size acquisition processing executed by the portable terminal.

FIG. 4 is a flowchart illustrating a procedure of sheet size acquisition processing executed by the portable terminal 200.

Initially, a user taps a "sheet size acquisition" icon on a home screen of the portable terminal 200, activating a dedicated application program for sheet size acquisition (hereinafter, "dedicated application") (step S101).

The dedicated application is an application previously accessed on the cloud server 400 and downloaded to the portable terminal 200 (see P2 in FIG. 8, described later).

When the dedicated application is downloaded, the icon is automatically registered on the portable terminal 200 and displayed on the home screen of the display 208. In this way, a user can activate the dedicated application simply by tapping the icon.

When the dedicated application is activated, the CPU 201 of the portable terminal 200 accesses the MFP 100 and acquires the device data stored in the device data storage 57 of the controller 50 of the MFP 100 (step S102).

The device data includes data related to the distances between the markers 22a, 22b, 22c, 22d and the angle $\theta_0$ of the manual feed tray 21 (see FIG. 1).

The data related to the distances between the markers 22a, 22b, 22c, 22d includes the actual lengths of the distance $L_{FD}$ between the feature points A and B, a distance $L_{p1}$ between the feature point A and a surface of the regulating plate 25 in contact with the sheet, and the distance $L_{CD}$ between feature points A and D.

The images being captured by the capture unit 203 are displayed on the display 208 (step S103).

In the present embodiment, the user consciously sets the portable terminal 200 so a longitudinal direction of the screen of the display 208 is approximately perpendicular to the feed direction of the manual feed tray 21 (i.e., parallel to a line between the feature points A and D) and the surface of the display 208 of the portable terminal 200 is approximately parallel to the upper surface 23 of the manual feed tray 21.

The images captured by the capture unit 203 are temporarily stored in page memory in the RAM 206 and displayed on the display 208 at a constant frame rate.

The image processing unit 205 of the portable terminal 200 extracts outlines from the captured image, and thereby detects the markers 22a, 22b, 22c, 22d and notifies the CPU 201. The CPU 201 determines whether or not the markers 22a, 22b, 22c, 22d at four corners are within the angle of view displayed on the display 208 (step S104).

Detection of markers is performed by matching the outlines extracted with marker images pre-registered in the dedicated application. In the case of marker shapes varying by device model, the device data acquired from the MFP 100 may include information related to marker shapes specific to the device model, and this information used in the matching processing.

Whether or not each marker is within the angle of view (an image capture range of the capture unit 203) can be determined by whether a memory address in page memory of each extracted marker image is within an image display range.

If all four of the markers 22a, 22b, 22c, 22d are not within the angle of view displayed on the display 208 ("NO" at step S104), the trapezoidal correction described later cannot be executed, and therefore the user changes the position and/or tilt of the portable terminal 200 and steps S103 and S104 are repeated until all four of the markers 22a, 22b, 22c, 22d are within the angle of view.

When "NO" is determined at step S104, a message to the user "please ensure all four markers are in view" may be displayed on the display 208.

The correction of image capture range by the user can be carried out to some extent intuitively, and therefore does not requires a great deal of time or effort.

Figure 5:
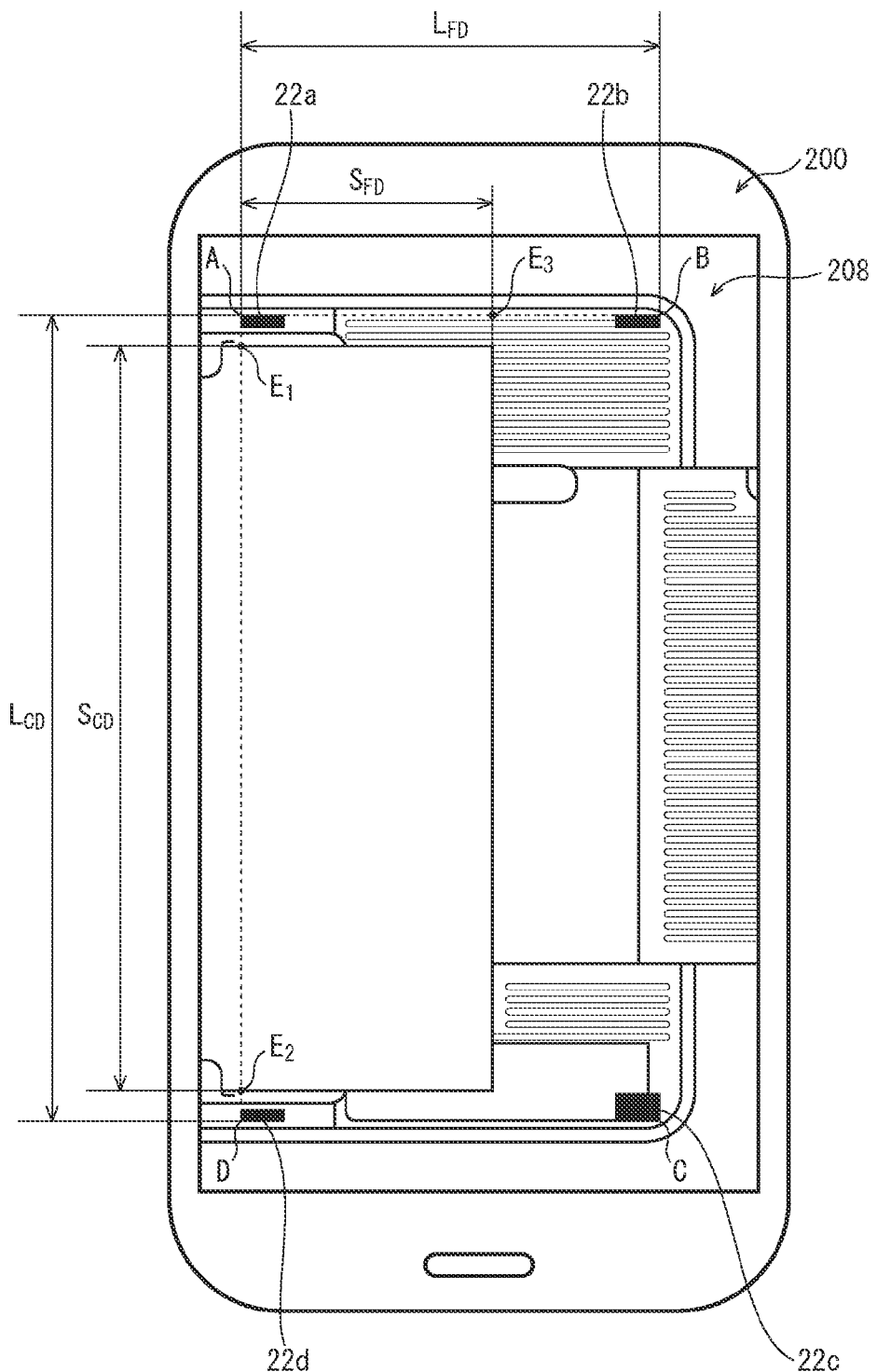
FIG. 5 illustrates an example of a captured image of the manual feed tray, as displayed on a display of the portable terminal.

FIG. 5 illustrates an example in which the four markers of the manual feed tray 21 are within the field of view and correctly displayed on the display 208 of the portable terminal 200.

When it is determined that the four of the markers 22a, 22b, 22c, 22d are within the field of view, i.e., "YES" in step S104, the next step is determining whether or not attitude angles of the portable terminal 200 are within an allowable range.

The display 208 of the portable terminal 200 and the sheet stacking surface 23 of the manual feed tray 21 are preferably approximately parallel. If the portable terminal 200 is excessively tilted with respect to the sheet stacking surface 23 of the manual feed tray 21, a four-cornered shape formed by the four of the markers 22a, 22b, 22c, 22d is considerably distorted, unlike the example in FIG. 5, and there is a risk of this hindering subsequent image analysis and sheet size specification.

As stated above the gyro sensor 209 is incorporated into the portable terminal 200, and therefore, as shown in FIG. 6, rotation about three axes can be measured, but according to the present embodiment only an angle $\alpha$ about an Xc axis (direction perpendicular to the longitudinal direction of the display 208 of the portable terminal 200) from the horizontal and an angle $\beta$ about a Yc axis (the longitudinal direction of the display 208 of the portable terminal 200) are determined. The angle $\gamma$ about a Zc axis (direction perpendicular to the display surface of the display 208 of the portable terminal 200) is not involved in determining parallelism between the sheet stacking surface 23 and the portable terminal 200, and therefore in the present description the angle $\alpha$ and the angle $\beta$ are used to define the attitude angle of the portable terminal 200.

In step S105, it is determined whether or not the angles $\alpha$ and $\beta$ of the portable terminal 200 with respect to the sheet stacking surface 23 are equal to or less than a predefined angle (for example, 15°).

At this time, by detecting the relative position of the marker 22c that differs in shape from the other markers in the captured image, the direction of the captured image of the manual feed tray 21 can be confirmed.

For example, if the marker 22c indicated in FIG. 5 is in the bottom right, it is apparent that paper is fed to the left of the image, and therefore the manual feed tray 21 is tilted about the Yc axis by the angle $\theta_0$, raising the manual feed tray 21 towards the right side of the image.

Here, it is determined whether or not the value of the angle $\beta$ detected by the gyro sensor 209 is $-15°+\theta_0 \leq \beta \leq 15°+\theta_0$. The sheet stacking surface 23 is not inclined in the Xc axis direction, and therefore it suffices to determine whether or not the angle $\alpha$ is $-15° \leq \alpha \leq 15°$.

In step S105, image capture is prevented when "NO" is determined, and processing returns to step S103. Only when both step S104 and step S105 result in "YES", image capture is allowed and the screen displayed on the display 208 is captured as a still image to the image memory region of the non-volatile memory 204 (step S106).

Subsequently, in step S107, the captured image is analyzed and trapezoidal correction is performed (step S107).

Various conventionally-known methods can be used for the trapezoidal correction.

Because sheet size is increased or decreased in steps according to widths in certain ranges defined by, for example, Japanese Industrial Standards (JIS), sheet size can be relatively easily specified without exactly detecting every dimension, and therefore the following describes an example of a simple trapezoidal correction method.

Figure 7A:
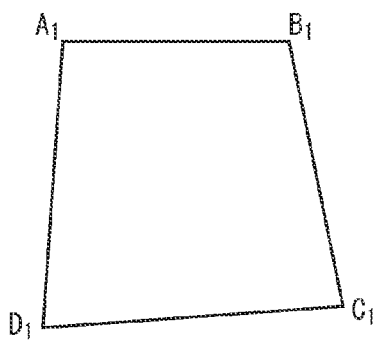
FIGS. 7A, 7B, 7C, and 7D are schematic diagrams illustrating a procedure of correction of trapezoidal distortion of the image data of the manual feed tray as captured by the portable terminal.

As an example, a four-cornered shape comprising the feature points A, B, C, and D of corners of the four markers 22a, 22b, 22c, 22d, extracted by image processing of the captured image is, in the initial captured image, a four-cornered shape A1B1D1C1, as shown in FIG. 7A.

Figure 7B:
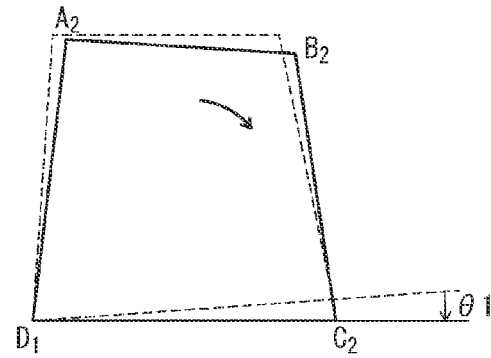

A line between C1 and D1 is rotated in the direction indicated by the arrow in FIG. 7B by an angle $\theta1$ to become horizontal, obtaining a four-cornered shape A2B2C2D1 (FIG. 7B).

Figure 7C:
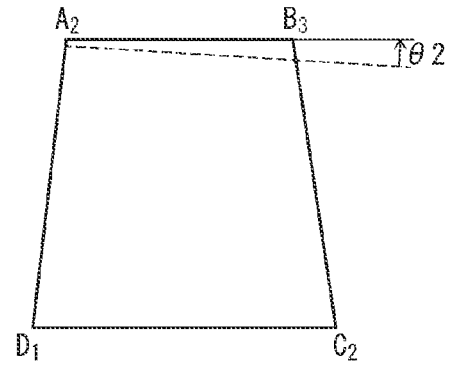

Further, to make the upper edge A2B2 and the lower edge D1C2 parallel, the upper edge A2B2 is rotated about A2 anticlockwise by an angle $\theta2$, and an intersection of a post-rotation A2B2 and an extension of a pre-rotation B2C2 is labelled B3 to obtain a trapezoid A2B3C2D1 (FIG. 7C).

Subsequently, so a corner A2D1C2 and a corner B3C2D1 become 90° angles, a line A2D1 and a line C3B4 are rotated outward by an angle $\theta3$ and an angle $\theta4$, respectively, to finally obtain a rectangle A3B4C2D1.

In this way, as an initially deformed four-cornered shape A1B1C1D1 is corrected to the rectangle A3B4C2D1, pixels on the four edges of the four-cornered shape and pixels within and around the four-cornered shape are rotated, expanded and/or compressed.

Figure 7D:
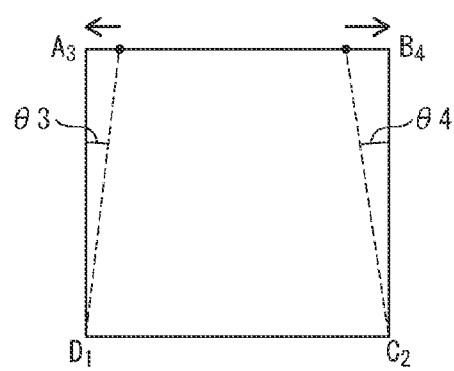

Thus, when rotating the four-cornered shape, other pixels are also rotated (FIG. 7B), angles of edges are changed as in FIG. 7C and FIG. 7D, and opposite edges are widened. Depending on the degree of widening in the vertical direction (FIG. 7C) or horizontal direction (FIG. 7D), pixel interpolation is performed by linear interpolation, for example, and pixels are thinned out to compress shrunk portions.

Returning to FIG. 4, image data that has undergone trapezoidal correction is further analyzed. An outline of the sheet S is extracted, and a pair of edges in the width direction (CD direction) and an edge upstream in the feed direction (FD direction) are detected (step S108).

The sheet S is plain white and lighter than the color of the sheet stacking surface 23 of the manual feed tray 21 beneath it, and therefore pixels at positions where changes in lightness are equal to or greater than a certain threshold can be detected as edges of the sheet S (hereinafter, "sheet edges").

Of course, other conventionally-known methods of detection such as a Hough transform or edge enhancement may be used.

Thus, sheet size can be specified (step S109), based on sheet edge position data from the image data, position data of ABCD feature point after trapezoidal correction, and device data, as described in an example below.

FIG. 5 shows an image displayed by the display 208 of the portable terminal 200 after trapezoidal correction. In this example, a ratio R1 of (i) a distance $S_{CD}$ in the image between edges in the width direction of the sheet to (ii) the distance $L_{CD}$ in the image from the feature point A of the marker 22a to the feature point D of the marker 22d can easily be calculated by using the memory addresses of the feature points A and D and points E1 and E2 along the sheet edges.

The actual length (L1) of the distance $L_{CD}$ is included in the device data acquired in step S106, and therefore the actual width of the sheet S represented by the distance $S_{CD}$ can be calculated by multiplying L1 by R1.

In a similar way, a ratio R2 is calculated of (i) a distance $S_{FD}$ from the feature point A of the marker 22a to the sheet edge in the FD direction to (ii) the distance $L_{FD}$ in the image from the feature point A of the marker 22a to the feature point B of the marker 22b.

If the actual length of the distance $L_{FD}$ between the feature points A and B of the markers 22a and 22b is L2, the actual length of the distance $S_{FD}$ can be calculated by multiplying the length L2 by the ratio R2.

The actual length of the distance Lp1 from the feature point A of the marker 22a to the regulating plate 25 that regulates a feed direction end position of the sheet S is already acquired from the MFP 100 in the device data, and therefore the actual length of the sheet S in the feed direction can be obtained by adding the actual length of the distance $S_{FD}$ to the actual length of the distance Lp1.

The data of the dedicated application includes a sheet size table (not illustrated) that associates the actual dimensions of sheet size in the feed direction and the width direction with sheet size defined by JIS (A3, A4, A5, . . . , B4, B5, B6, . . . , in both portrait (T) and landscape (Y) orientations). By referencing the sheet size table, the size of the sheet currently stacked on the manual feed tray 21 can be specified.

For example, if the actual lengths in the feed direction and the width direction are 210 mm and 294 mm, the sheet size is determined to be A4 Y, and this sheet size is displayed on the display 208 of the portable terminal 200 to notify a user (step S110).

Note that even if the actual lengths L1, L2, and Lp1 are not included in the device data, as long as the combination of the ratios R1 and R2 and a table corresponding to sheet sizes are included, sheet size can be specified by referring to the table.

Data specifying sheet size is transmitted to the MFP 100 via the LAN (step S111).

Thus, the sheet size acquisition by the portable terminal 200 is completed and the dedicated application is terminated.

On the side of the MFP 100, the sheet size is associated with the manual feed tray 21 and stored in, for example, the device data storage 57. This association may be displayed on the display 41 of the operation panel 40.

Subsequently, when a user selects the manual feed tray 21 as a paper feed, the sheet S is supplied from the manual feed tray 21 and a copy job or print job is executed.

According to the present invention, when a dedicated application for specifying sheet size is pre-installed on the portable terminal 200, the sheet size of a sheet set on the manual feed tray 21 of the MFP 100 can easily be set simply by activating the dedicated application and capturing an image of the manual feed tray 21.

(4) Communication Sequence

Figure 8:
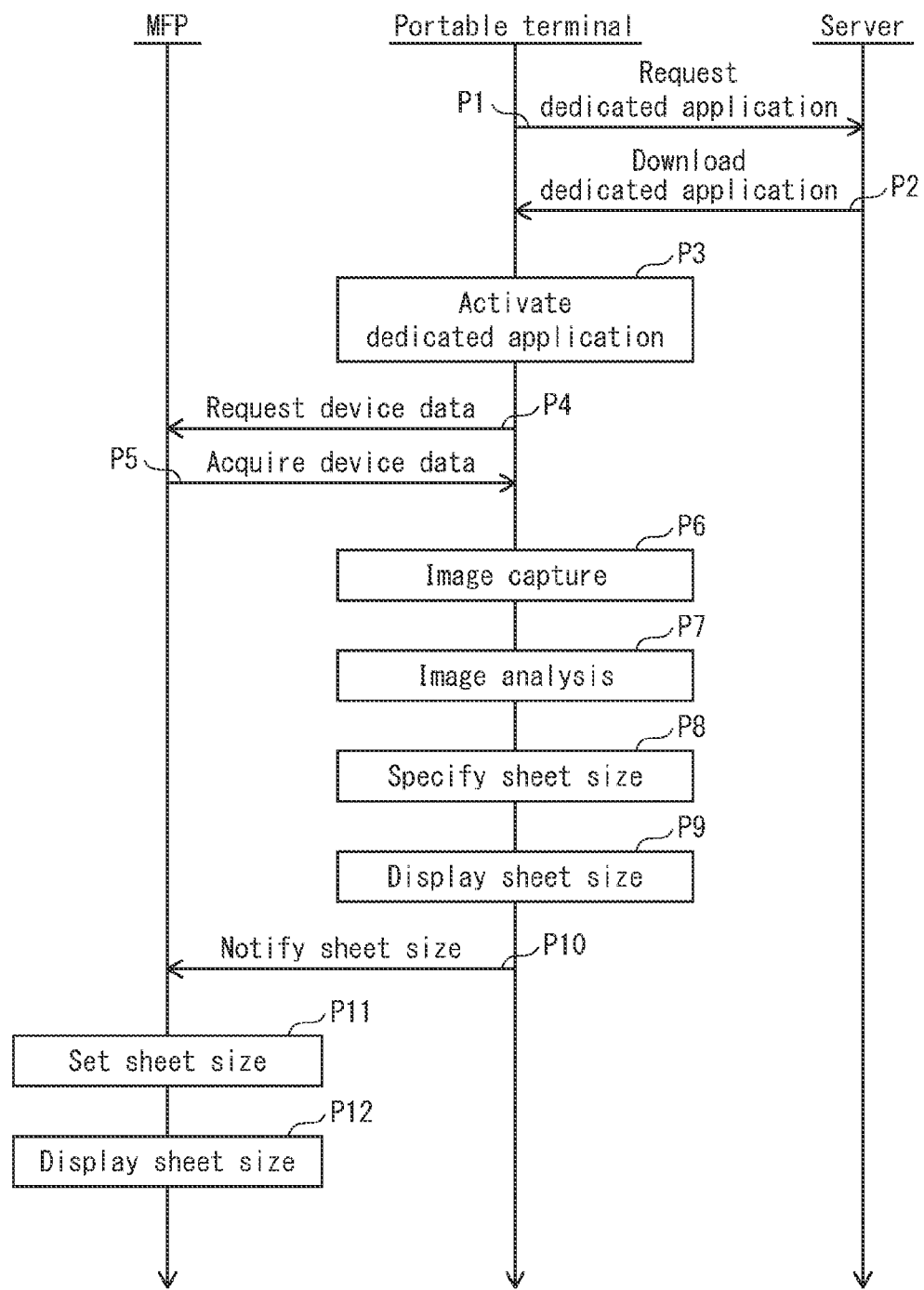
FIG. 8 illustrates a communication sequence between the MFP, portable terminal, and server pertaining to the embodiment of the present invention.

FIG. 8 illustrates a communication sequence between the MFP 100, the portable terminal 200, and the server 400.

In the following, in order to abbreviate description, the processing of steps S103 to S106 in the flowchart of FIG. 4 is referred to as "image capture" and the processing of steps S107 and S108 is referred to as "image analysis".

In advance, a user requests that the server 400 transmits the dedicated application (P1), and downloads the dedicated application to the portable terminal 200 (P2).

Subsequently, the user taps an icon of the dedicated application that is registered on the portable terminal 200 and displayed on the display 208, activating the dedicated application (P3), requesting transmission of device data from the MFP 100 (P4), and acquiring the device data from the MFP 100 (P5).

Subsequently, image capture (P6) and image analysis (P7) are executed.

As described above, sheet size is specified from a result of image analysis and the device data (P8), the sheet size is displayed on the display 208 (P9), and data of the specified sheet size is transmitted to the MFP 100 (P10).

In the MFP 100, the sheet size is associated with the manual feed tray 21 and registered in a table in memory of the controller 50 (sheet size setting P11), and data of the sheet size is displayed on the display 41 (P12).

According to the present invention, a dedicated application is installed on the portable terminal 200, which is a typical, widespread device, the dedicated application is activated as required, and sheet size of a sheet on the manual feed tray 21 is automatically specified simply by image capture. In the MFP 100 the sheet size is associated with the manual feed tray 21 and set, and therefore a sensor, wiring, etc. for detecting sheet size on the manual feed tray 21 are not required in the MFP 100, contributing to cost reductions in the MFP 100. Further, the time and effort required for a user to judge sheet size and manually input sheet size to the MFP 100 are not required.

<Modifications>

The present invention is not limited to the embodiment above, and the following modifications may be made.

(1) According to the embodiment above, the portable terminal 200 requests and acquires the device data from the MFP 100 (P4 and P5 in FIG. 8), but the device data may be acquired from the server 400.

Figure 9:
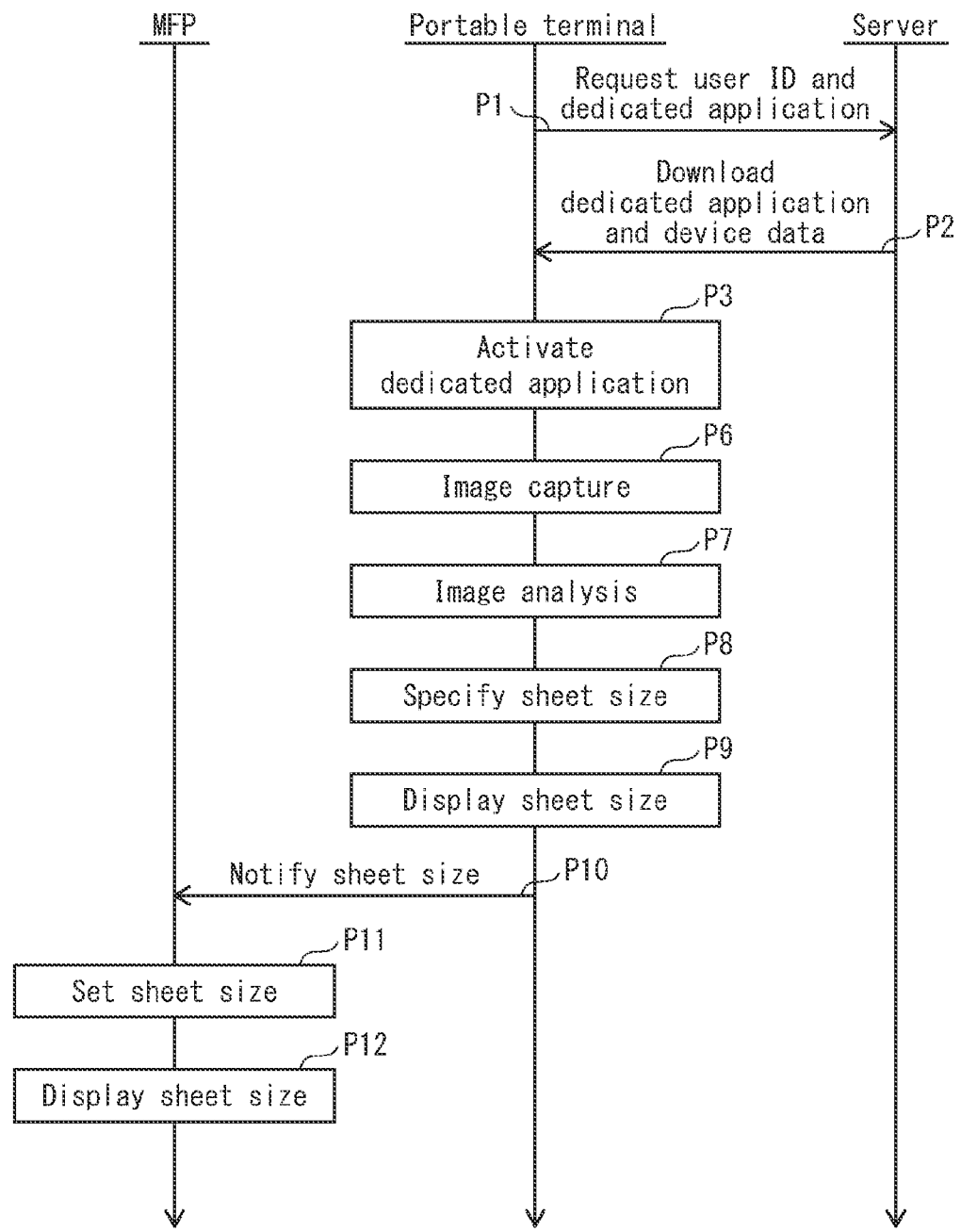
FIG. 9 illustrates Modification 1 of a communication sequence between the MFP, portable terminal, and server.

FIG. 9 shows a communication sequence illustrating this modification.

For example, when purchasing the MFP 100, a user ID may be associated with the model of the MFP 100 and registered in the table of a storage device, such as an HDD, in the server 400.

Further, in the storage device of the server 400, device data from the maker of the MFP 100 that includes the actual dimensions is associated with each model of the MFP 100 and stored therein.

When the user operates the portable terminal 200 to indicate the user ID and send a transmission request for the dedicated application to the server 400 (P1), the server 400 transmits the dedicated application along with the device data corresponding to the user ID, causing the portable terminal to download the dedicated application and the device data (P2).

When the dedicated application is activated (P3) in the portable terminal 200, the device data of the MFP 100 is also read, and therefore there is a benefit that the steps P4 and P5 in FIG. 8, in which the device data is queried from the MFP 100, are eliminated.

The other steps are the same as in FIG. 8 and therefore description is omitted here.

(2) According to the embodiment, a dedicated application is activated, and image capture, analysis, and sheet size specification are all executed by the portable terminal 200. Thus, the processing load in the portable terminal 200 is high.

Depending on the model of the portable terminal 200, the processing speed of the CPU 201 may be slow and the capacity of the non-volatile memory 204 may be small, and therefore the portable terminal 200 may not be well-suited for running the dedicated application.

According to this modification, processing up until image capture is executed by the portable terminal 200, then captured image data is transmitted to the server 400, and image analysis and sheet size specification is executed by the server 400.

Figure 10:
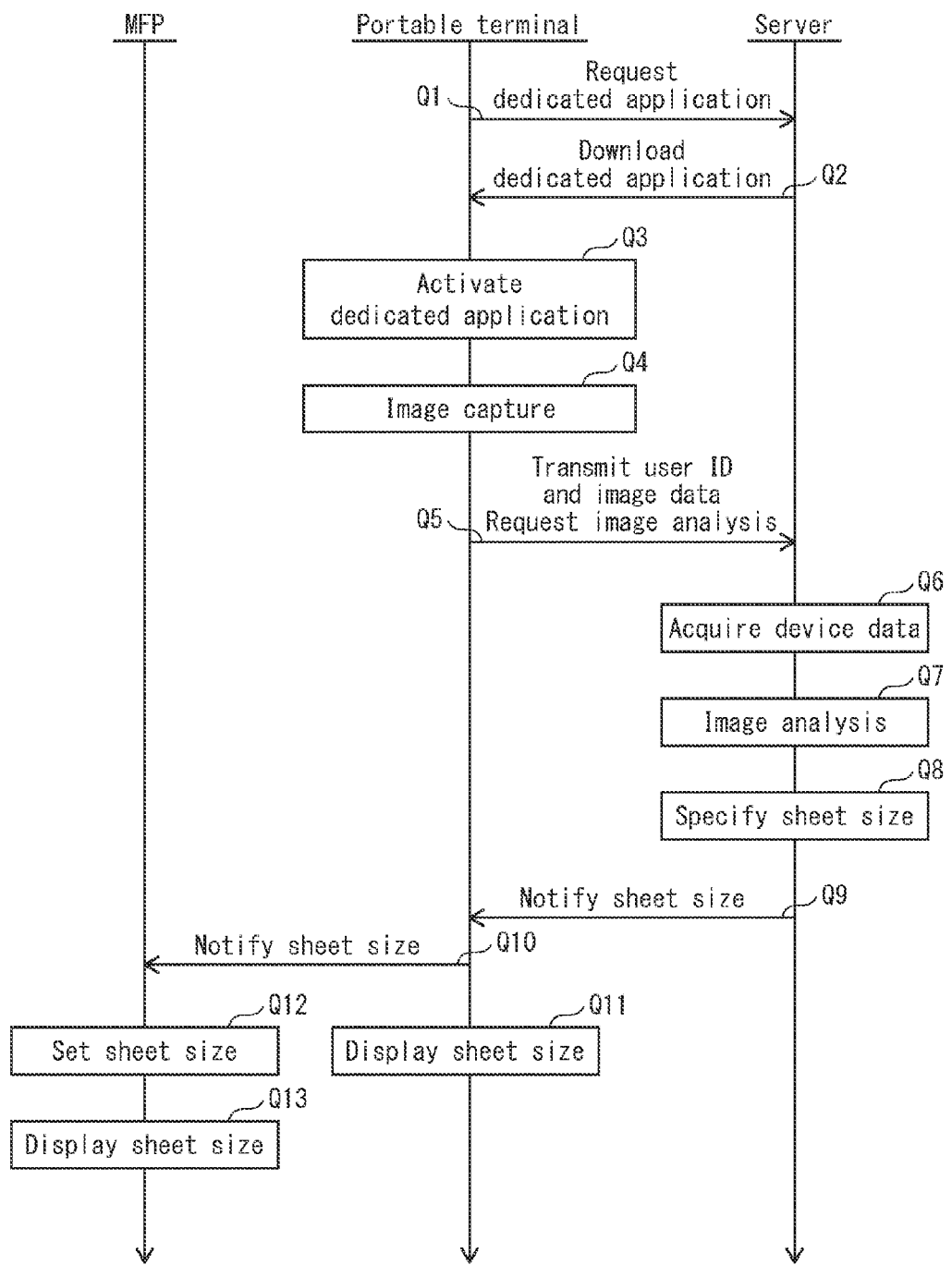
FIG. 10 illustrates Modification 2 of a communication sequence between the MFP, portable terminal, and server.

FIG. 10 illustrates a communication sequence between the MFP 100, the portable terminal 200, and the server 400, according to this modification.

In advance, the portable terminal 200 access the server 400, requests the dedicated application, and downloads the dedicated application (Q1, Q2).

When acquiring the sheet size of a sheet on the manual feed tray 21, the dedicated application is activated on the portable terminal 200 (Q3) and image capture is executed (Q4).

Here, compared with the dedicated application of FIG. 8 and FIG. 9, the dedicated application may be simplified by not including programs to analyze an image or specify sheet size on the portable terminal 200.

Along with the captured image data and the user ID, an image analysis request is transmitted to the server 400 (Q5). By setting the user ID to be pre-registered on the portable terminal 200 and automatically transmitted, a user need not input the user ID whenever image data is transmitted to the server 400.

As in Modification (1), the user ID is pre-associated with the model of the MFP 100 and the device data and pre-registered in the table of the server 400, and the table is referenced on the server 400 to acquire the device data of the MFP 100 (Q6).

Further, the server 400 activates the dedicated application upon receiving the image analysis request from the portable terminal 200, executes image analysis (Q7), and executes sheet size specification based on the image analysis (Q8).

When the sheet size is specified, the server 400 notifies the portable terminal 200 of the specified sheet size (Q9).

The portable terminal 200 notifies the MFP 100 of the sheet size (Q10) and displays the sheet size on the display 208.

The MFP 100 sets the sheet size to be registered in association with the manual feed tray 21 in a table in internal memory (Q12), and displays the associated data on the display 41 of the operation panel 40 (Q13).

The device data may be obtained as in FIG. 8, in which the portable terminal 200 queries the MFP 100, and the server 400 is notified of the response.

According to this modification, the image analysis which requires a relatively high processing load is executed by the server 400, and therefore the memory capacity needed for executing the dedicated application on the portable terminal 200 can be small, and the load on the CPU 201 of the portable terminal 200 can be low.

Figure 11:
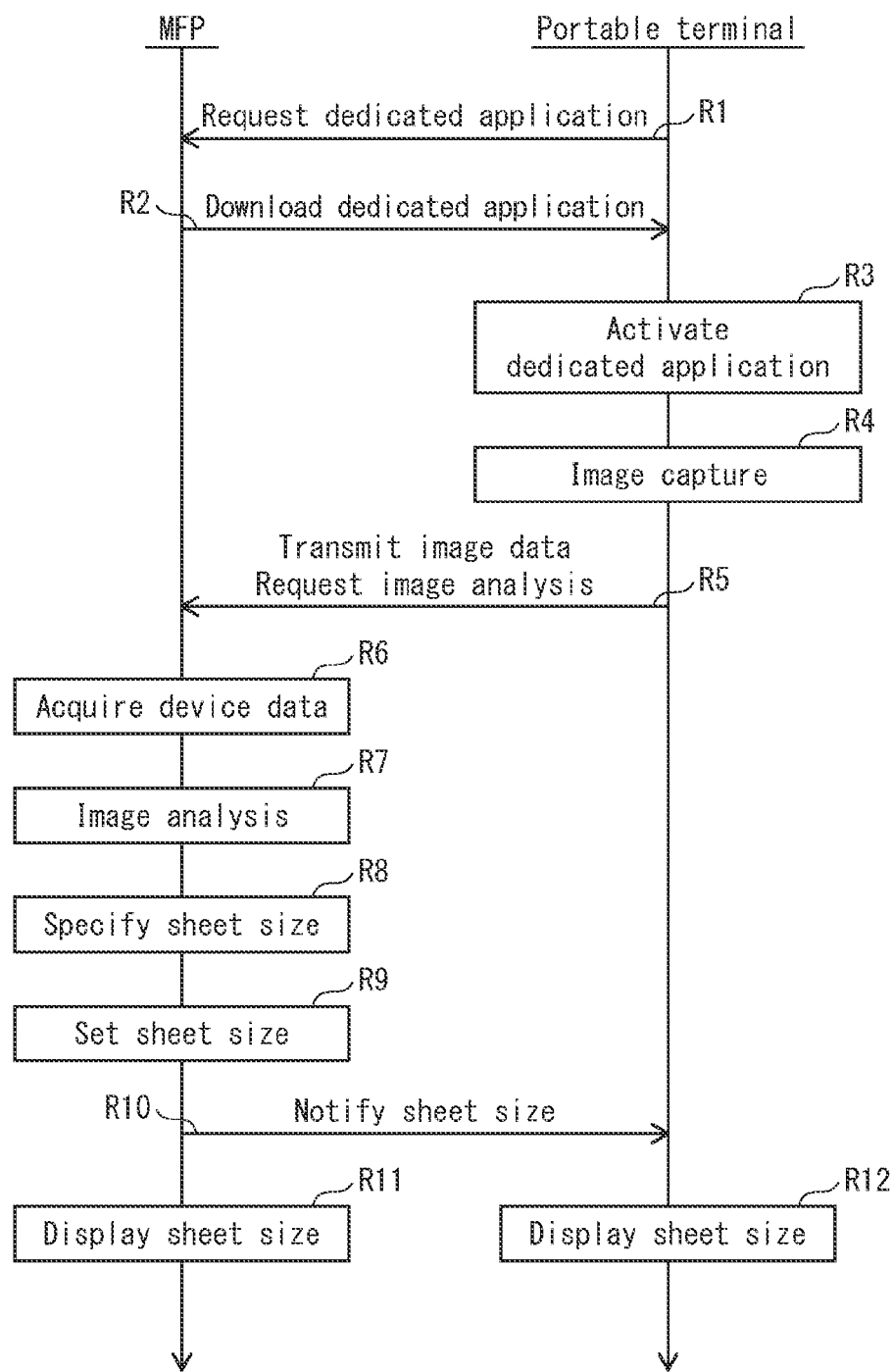
FIG. 11 illustrates Modification 3 of a communication sequence between the MFP, portable terminal, and server.

(3) FIG. 11 illustrates a communication sequence between the MFP 100 and the portable terminal 200 in sheet size acquisition pertaining to a further modification.

This modification differs from the embodiment in that the portable terminal acquires the dedicated application from the MFP 100 and the MFP 100 executes image analysis and sheet size specification.

In other words, in advance, the portable terminal 200 accesses the MFP 100, requests the dedicated application, and downloads the dedicated application from the MFP 100 (R1, R2).

After the dedicated application is activated on the portable terminal 200 (R3), the portable terminal 200 executes image capture (R4), and transmits the captured image data to the MFP 100 along with an image analysis request (R5).

The controller 50 of the MFP 100 acquires the device data from the device data storage 57 (R6), and executes image analysis of the image data received from the portable terminal 200 (R7).

Based on the image analysis results and the device data, sheet size is specified (R8), and the sheet size is set in association with the manual feed tray 21 (R9).

The MFP 100 notifies the portable terminal 200 of the sheet sized specified (R10), and displays the sheet size on the display 41 of the operation panel 40 (R11).

The portable terminal 200 receives the data of the specified sheet size from the MFP 100 and displays the information on the display 208 (R12).

According to this modification, the image analysis which requires a relatively high processing load is executed by the MFP 100, and therefore the memory capacity needed for executing the dedicated application on the portable terminal 200 can be small, and the load on the CPU 201 of the portable terminal 200 can be low.

Further, the MFP 100 specifies the sheet size based on image data acquired from the portable terminal 200, and therefore does not need to acquire the device data from elsewhere.

According to this modification, the dedicated application that executes image processing on the portable terminal 200 is acquired from the MFP 100, but, as in the embodiment, may be acquired from the server 400.

(4) According to the embodiment, during image analysis, after trapezoidal correction by using the feature points A to D of the markers 22a to 22d, position data (distance data) of the feature points A, C, and D and edge positions of the sheet S are detected, and sheet size is specified.

According to this modification, internal edge positions of the pair of the guide members 24 are detected, a distance $L_G$ (see FIG. 2) between both edges is calculated, and a set status of the sheet on the manual feed tray 21 is checked.

In other words, during image analysis, a ratio R3 is calculated of the distance between the feature points AD to the distance between the edges of the guide members 24. By multiplying the actual length of the distance between the feature points AD in the device data by the ratio R3, the actual length of the distance $L_G$ between the edges of the guide members 24 is calculated.

If the actual length of the distance $L_G$ is at least a predefined value greater than the actual width of the sheet calculated according to the embodiment, a gap exists between the guide members 24 and edges of the sheet in the width direction.

In this case, there is a high probability that the sheet is not set by the guide members 24 to a position centered on a center line in the width direction of the manual feed tray 21 (see the dashed line $L_C$ in FIG. 14) and there is a risk that skew may occur when the pick-up roller 26 (see FIG. 2) feeds the sheet, and therefore it is preferable to alert the user to reset the sheet.

Figure 12:
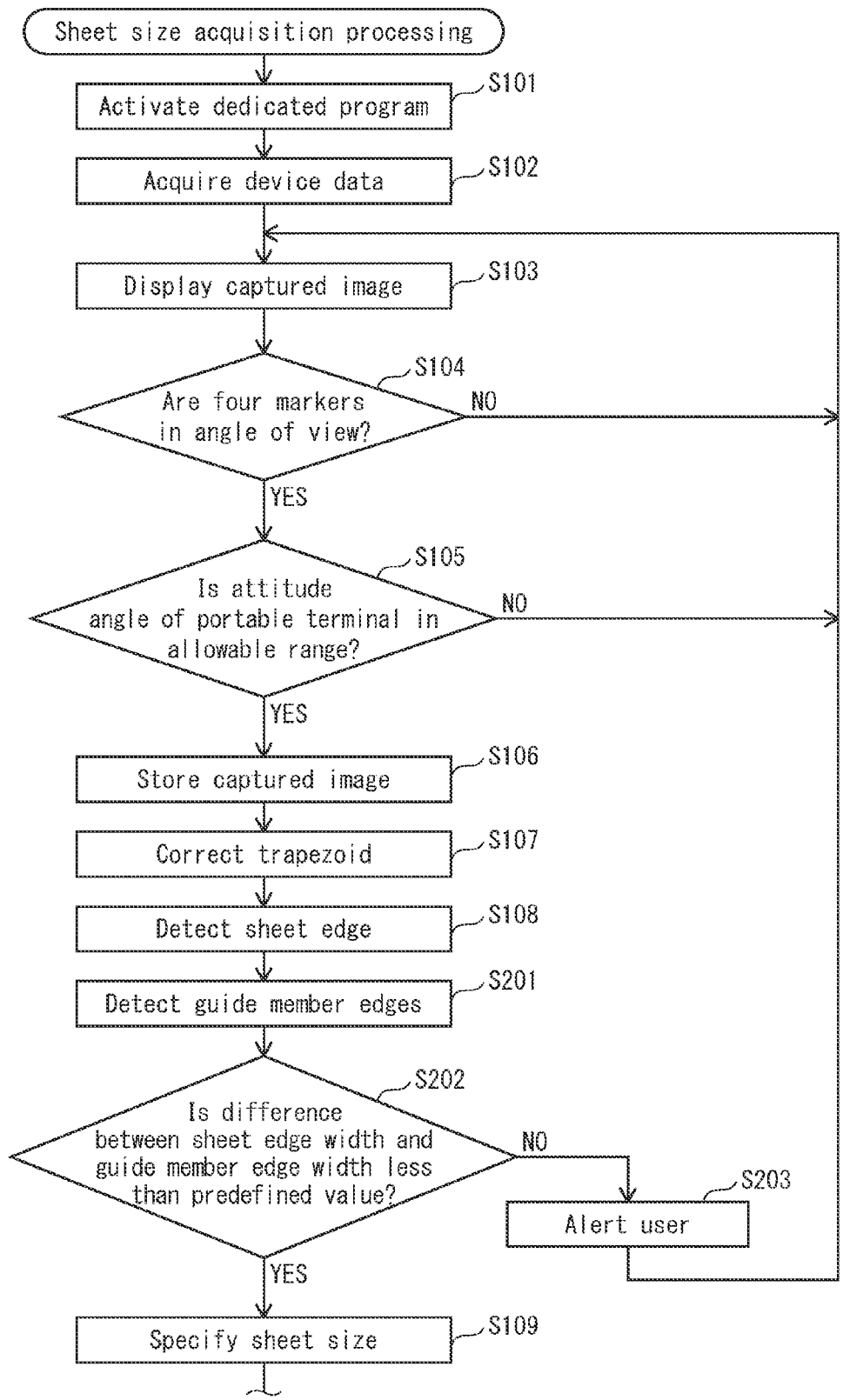
FIG. 12 is a modification example of a flowchart illustrating a procedure of sheet size acquisition processing.

FIG. 12 is a partial flowchart showing sheet size acquisition executed by the portable terminal 200 according to this modification. This differs from the flowchart in FIG. 4 of the embodiment in that steps S201, S202, and S203 are inserted after step S108.

In other words, after detecting edges of the sheet in step S108, an outline of the guide members 24 is extracted by using conventionally-known image processing, detecting internal edges of the guide members 24 (step S201).

Based on the device data obtained in step S102, the actual lengths of the distances between sheet edges and guide member edges in the width direction are calculated, and whether or not a difference between the two is greater than or equal to a predefined value is determined (step S202).

In other words, from the position data of the feature points A and D of the markers 22a and 22d, the position data of both edges of the sheet in the width direction, and the position data of the internal edges of the guide members 24, intervals (number of pixels) between memory addresses in the image data are calculated. Ratios R1 and R3 of $S_{CD}$ (see FIG. 5) and $L_G$ (see FIG. 2) to $L_{CD}$ are calculated. The actual lengths of the sheet edge width $S_{CD}$ and the guide member edge width $L_G$ are calculated by multiplying the actual length of $L_{CD}$ from the device data by the ratios R1 and R3. Finally, whether or not the difference between the actual length of $L_G$ and the actual length of $S_{CD}$ is less than a predefined value (for example, 3 mm) is determined.

When the result of this determination is affirmative, i.e., the difference is less than the predefined value ("YES" at step S202), there is little risk of skew occurring when the sheet is picked up, and therefore the next step of sheet size specification is executed (step S109).

However, when the result of this determination is negative, i.e., the difference is equal to or greater than the predefined value ("NO" at step S202), the guide members 24 will not sufficiently function as guides when feeding sheets and there is a risk of skew occurring, and therefore the portable terminal 200 displays a message on the display 208 warning the user and prompting the user to narrow the guide members 24 and correct the position of the sheet S in the width direction (step S203). Processing returns to step S103 and repeats.

The content of this warning may be transmitted to the MFP 100, and displayed on the display 41 of the operation panel 40.

When a user, based on the warning displayed on the display 208, makes the guide members 24 lightly contact the edges of the sheet in the width direction and sets the sheet, "YES" will be determined in the next step S202, and therefore sheet size specification is executed in the following step S109.

Details of the other steps are the same as described with reference to FIG. 4, and therefore description is omitted here.

(4) According to the embodiment, communication between the MFP 100 and the portable terminal 200 is performed via a LAN, but when both the MFP 100 and the portable terminal 200 have communication functions such as Bluetooth (registered trademark) or infrared, such communication functions may be used.

Figure 13:
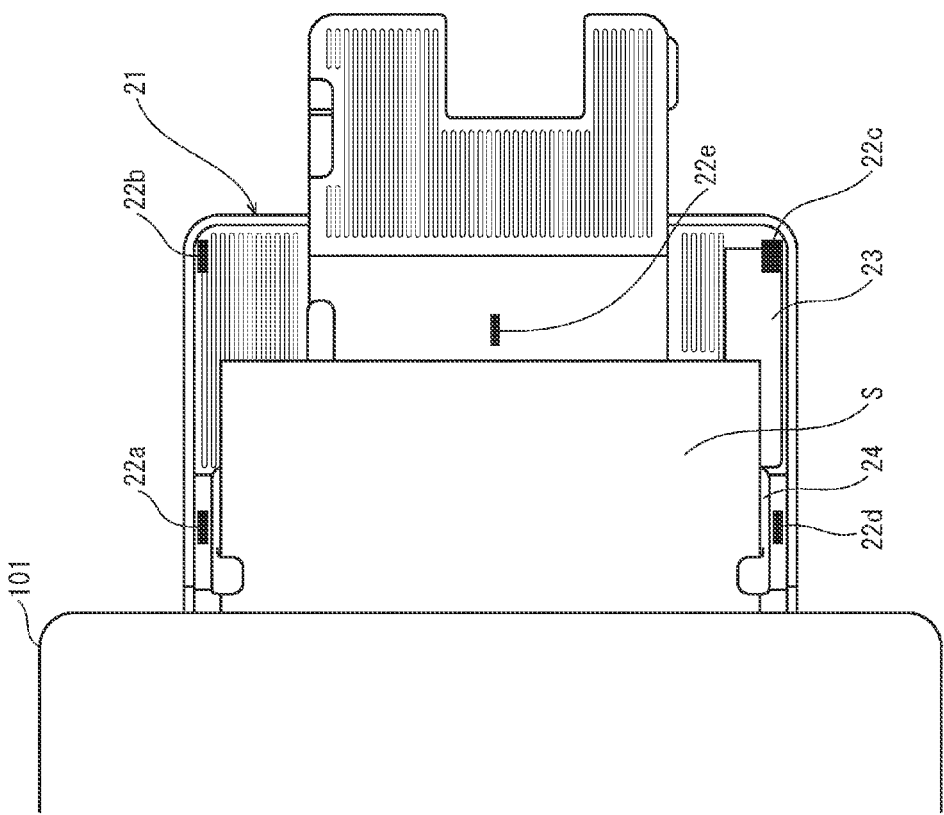
FIG. 13 is a drawing for describing a modification in which a marker is added to a central portion of the manual feed tray to aid in sheet size acquisition.

(5) According to the embodiment, the markers 22a, 22b, 22c, 22d are on the sheet stacking surface 23 of the manual feed tray 21 and are used as a basis for determining whether image capture is stored, a basis for trapezoidal correction, and for sheet size specification. However, for example as illustrated in FIG. 13, a marker 22e (secondary marker) may be provided centrally on the sheet stacking surface 23, and depending on whether or not the marker 22e is covered and hidden by a sheet, the marker 22e may be used in classification of sheet size.

Figure 14:
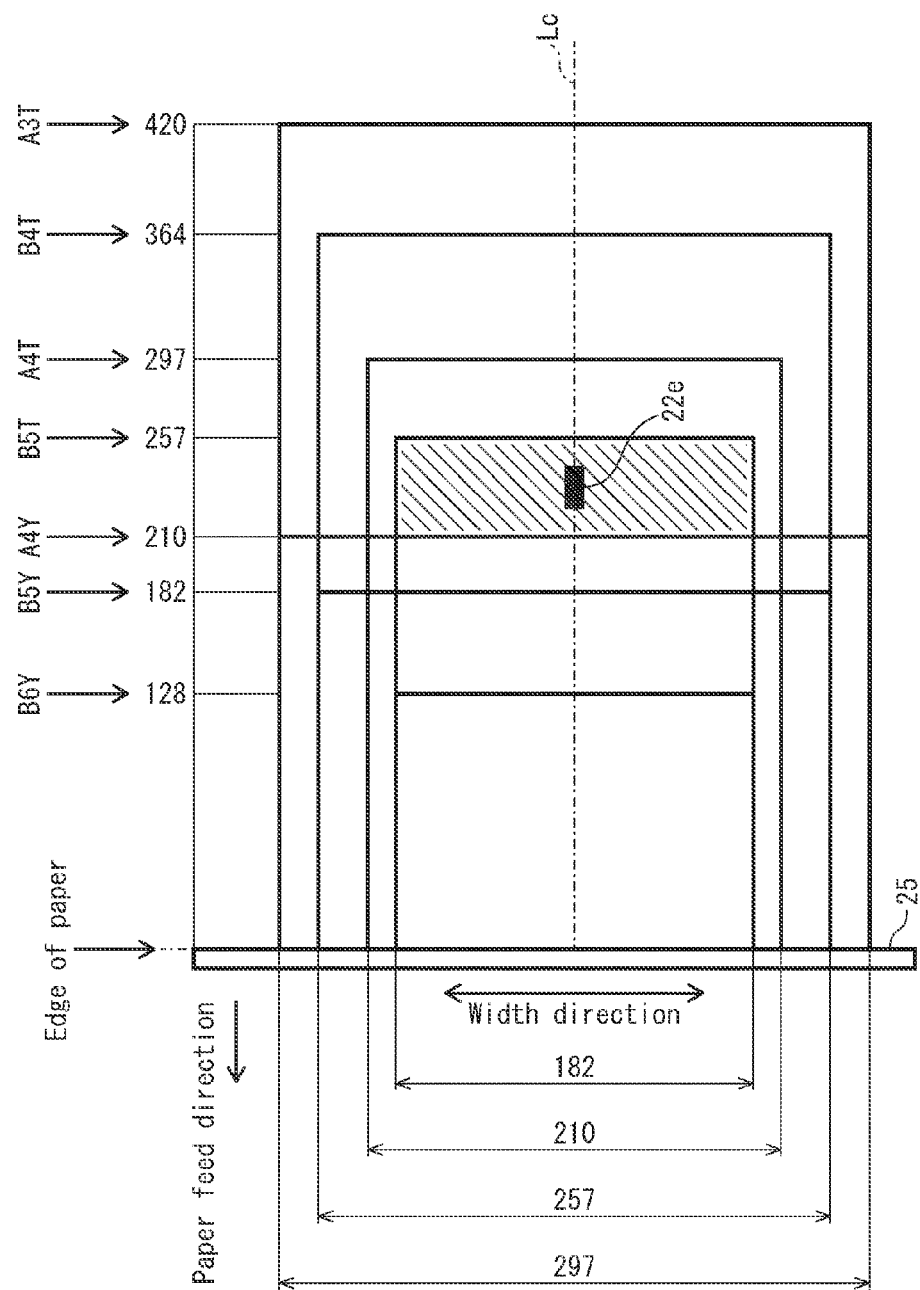
FIG. 14 is a drawing for describing a positional relationship between each sheet size and the marker of the central portion.

FIG. 14 illustrates an example of preferred ranges in which the marker 22e can be located on the sheet stacking surface 23 of the manual feed tray 21.

When the marker 22e is in the range indicated by hatching in FIG. 14, specification of sheet size of sheets relatively frequently used in the MFP 100 can be determined by calculating the actual length in the width direction (AD direction) from the image data after trapezoidal correction and whether or not the marker 22e is visible in the captured image.

For example, when the actual length in the width direction is found to be 257 mm, and image analysis determines that the marker 22e is visible in the image, the sheet size can be specified as B5, Y orientation, and when image analysis determines that the marker 22e is not visible in the image, the sheet can be specified as B4, T orientation. Further, when the actual length in the width direction is found to be 297 mm, and image analysis determines that the marker 22e is visible in the image, the sheet size can be specified as A4, Y orientation, and when image analysis determines that the marker 22e is not visible in the image, the sheet size can be specified as A3, T orientation. Similarly, B6, Y orientation, B4, Y orientation, and A4, T orientation, can be specified.

According to this method, sheet size can be specified without calculating the actual length of the sheet in the feed direction, as in the embodiment, and therefore sheet size specification is simplified.

(6) According to the embodiment, a simple method of trapezoidal correction in image analysis is described, but other methods of trapezoidal correction may be used that are widely known in the field of image processing for digital cameras, such as camera calibration that uses a homography matrix (keystone correction).

Figure 15:
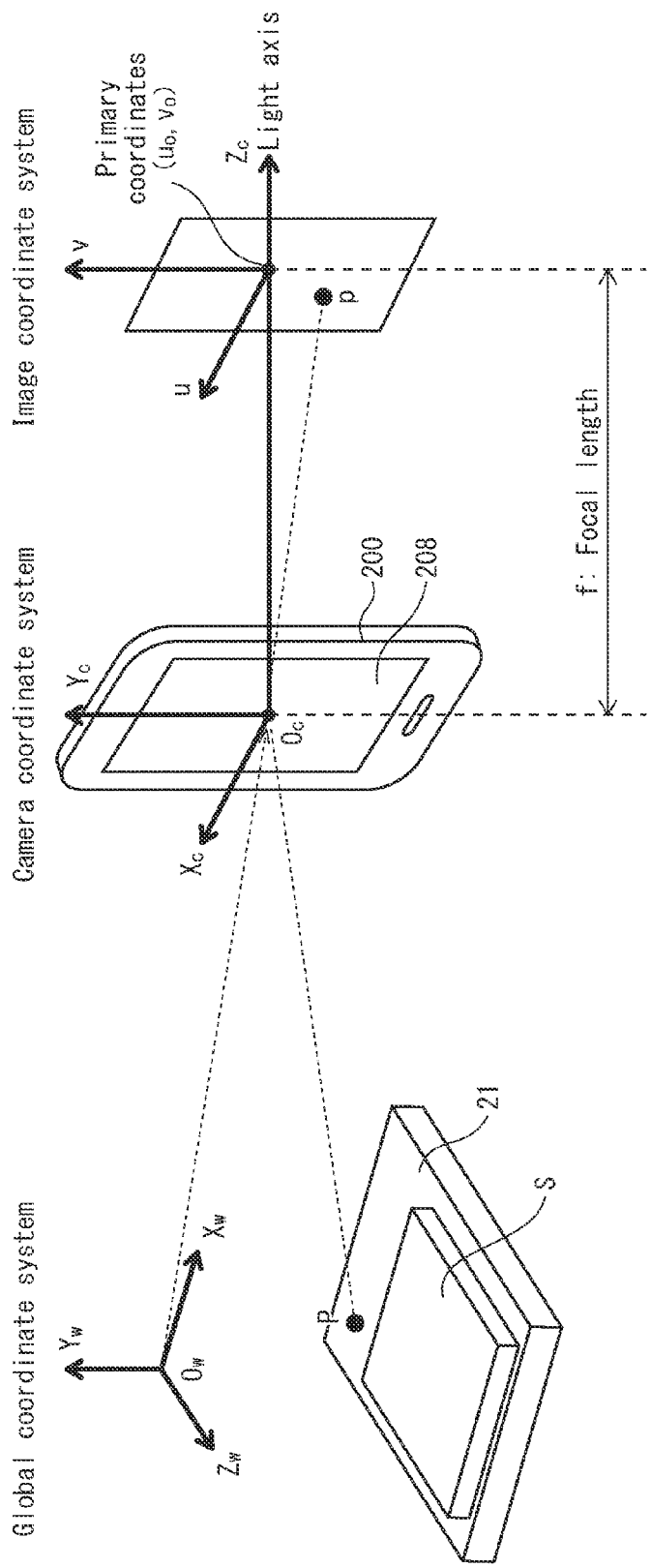
FIG. 15 is a drawing for describing an example of a method of camera calibration as a modification of trapezoidal correction of the present invention.

The following is a simplified description of an example of camera calibration based on FIG. 15.

A coordinate P in a three-dimensional coordinate system (global coordinate system) of the manual feed tray 21 and a coordinate p in a two-dimensional coordinate system (image coordinate system) of projection transformation on the display 208 satisfy the following Equation 1.

$$sp = HP \qquad \text{(Equation 1)}$$

Here, s and H are referred to as external parameters along with the coordinates P and p. The external parameter s is a scale factor and the external parameter H indicates a homography matrix.

The scale factor s is a coefficient indicating a ratio of displacement amount between the world coordinate system and the image coordinate system.

Further, the homography matrix H is a matrix for projection transformation of the coordinate P to the coordinate p, and is indicated in the following Equation 2.

$$H = [h_1 \; h_2 \; h_3] = \begin{bmatrix} f \cdot s_u & f \cdot k_s & u_0 \\ 0 & f \cdot s_v & v_0 \\ 0 & 0 & 1 \end{bmatrix} [r_1 \; r_2 \; t] \quad \text{(Equation 2)}$$

In the above Equation 2, the following parameters are referred to as internal parameters.

f: Focal length of lens of the capture unit 203 of the portable terminal 200

($s_u$, $s_v$): Pixel distance in the horizontal direction ($s_u$) and pixel distance in the vertical direction ($s_v$) onscreen on the display 208

($u_0$, $v_0$): Primary coordinates (center coordinates) of the image in the image coordinate system $k_s$: Shear modulus $r_1$: Rotational movement from the horizontal direction about the Xc axis of the portable terminal 200

$r_2$: Rotational movement from the horizontal direction about the Yc axis of the portable terminal 200 t: Parallel movement

Of these external parameters, r1 and r2 are measured by the gyro sensor 209 of the portable terminal 200.

In one image capture, by substituting into Equation 1 the global coordinates of the four feature points A, B, C, and D on the manual feed tray 21 and coordinates of four feature points p in the corresponding image coordinate system, two simultaneous equations are established.

When image capture is performed three times, r1, r2, and t will be slightly different, and six simultaneous equations can be obtained. By solving the equations, it is possible to estimate the external parameters and internal parameters.

Methods of automatically correcting distorted captured images in this way are referred to as camera calibration, and various methods have been proposed as methods of estimating internal parameters and external parameters.

The above-describe example uses Zhang's algorithm, details of which are disclosed in Zhengyou Zhang "A flexible new technique for camera calibration", *Microsoft Research*, Technical Report MSR-TR-98-71, 1998.

Further, the Open Source Computer Vision Library, often referred to as OpenCV, proposes specific programs that estimate internal parameters and external parameters according to the above algorithm, and therefore more detailed description is omitted here.

Of course, methods of estimating internal parameters and external parameters are not limited to the above example, and internal parameters and external parameters may be estimated by other known methods.

According to the camera calibration described above, the trapezoidal image of the manual feed tray 21 on the display 208 is corrected to be rectangular (trapezoidal correction), and therefore by executing steps S108 in FIG. 4 as in the embodiment, sheet size can be more accurately specified.

(7) The number of markers on the sheet stacking surface 23 of the manual feed tray 21 is preferably four for determining imaging range and performing trapezoidal correction, but according to protocols executed in trapezoidal correction the number of markers may be three, five, or more.

(8) According to the embodiment, a system is described that specifies the size of a sheet on the manual feed tray 21 by using a dedicated application and the image capture function of a portable terminal. However, the system may also be applied to sheet size detection of a sheet in a paper feed cassette housed inside the body 101 of the MFP 100 that can be pulled out to perform sheet replacement and replenishment.

In this case, in a state in which the paper feed cassette is pulled out, four markers are required to be positioned to not be covered by sheets or sheet guides, to allow image capture.

However, when a plurality of sheet stacking locations such as paper feed cassettes and manual feed trays are present, and sheet sizes of sheets stacked on these location are specified by using the portable terminal 200, information specifying the stacking location (hereinafter, "stacking location specification information") is preferably in positions on the sheet stacking surfaces of the paper feed cassettes and manual feed trays that can be image captured. This stacking location specification information is preferably appended in a form that can be acquired by image analysis, such as marker shape, marker number, or a reference sign.

The device data includes data required for sheet size specification, associated with the stacking location specification. Sheet size specified by the portable terminal 200 is stored in the memory of the MFP 100 in correspondence with the stacking location specification information.

(9) According to the embodiment, a ratio of the distance between sheet edges and the distance between markers is calculated, and the actual length between the sheet edges is calculated from the actual length between markers. However, instead of markers, an outline of the manual feed tray 21 may be used.

For example, edges in the width direction of the manual feed tray 21 can be detected, a ratio R4 can be calculated of the distance between sheet edges to a distance Lt (see FIG. 2) between the edges of the manual feed tray 21. The actual width (distance between edges) of the manual feed tray 21 is included as device data, and the width of the manual feed tray 21 can be multiplied by the ratio R4 to calculate the actual width of the sheet in the CD direction.

Similarly, size of the sheet in the FD direction can be detected in a similar way to the embodiment by detecting an edge of the manual feed tray 21 upstream in the FD direction and an edge of the sheet upstream in the FD direction.

(10) According to the embodiment, an MFP is described as an example of an image forming device, but the image forming device may be a dedicated printer or a dedicated fax machine that has a sheet stacking tray. Further, the image forming device may be monochrome or color.

(11) The embodiment and each modification may be combined in any possible combinations.

The present invention can be understood as a method of sheet size specification for specifying sheet size by using the portable terminal 200, and can be understood as a dedicated application program that can be downloaded to the portable terminal 200.

Acquisition of the dedicated application is not limited to acquisition via a network as described for the embodiment. For example, the dedicated application may be stored on a computer-readable storage medium, and the portable terminal 200 may read the computer-readable storage medium and install the dedicated application.

Examples of the computer-readable storage medium include magnetic tape, magnetic disks such as flexible disks, optical recording mediums such as DVD, CD-ROM, CD-R, MO, and PD, and flash memory such as USB memory, Smart Media (registered trademark), and Compact Flash (registered trademark).

Further, the present invention may be understood as an image forming device that can specify sheet size by connecting to a network and the portable terminal 200.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. A sheet size specification system for specifying size of a sheet on a sheet stacking tray of an image forming device by using an image capture unit of a portable terminal, the system comprising:
    an analyzer that analyzes image data captured by the image capture unit, the image data indicating the sheet stacking tray and the sheet thereon; and
    a size specifier that acquires, from the analyzed image data, first position data indicating positions of predefined feature points of the sheet stacking tray and second position data indicating positions of an outline of the sheet, and specifies size of the sheet on the sheet stacking tray based on the first position data and the second position data.

2. The sheet size specification system of claim 1, wherein the image forming device has a storage that stores, in association with the sheet stacking tray, sheet size data specified by the size specifier.

3. The sheet size specification system of claim 1, wherein the analyzer and the size specifier are included in the portable terminal.

4. The sheet size specification system of claim 1, wherein the analyzer and the size specifier are included in the image forming device, and
    the portable terminal transmits image data of the sheet stacking tray to the image forming device and the image forming device performs analysis and sheet size specification by using received image data.

5. The sheet size specification system of claim 1, wherein the portable terminal comprises:
    an attitude angle detector that detects an attitude angle of the portable terminal; and
    a first prohibiting unit that prevents the image capture unit from capturing an image of the sheet stacking tray when an angle of tilt of the portable terminal relative to a sheet stacking surface of the sheet stacking tray is determined to be outside a predefined range.

6. The sheet size specification system of claim 1, wherein the sheet stacking tray has a pair of guide members that are moveable in a direction perpendicular to a sheet transport direction, which regulate sheet placement by contacting edges of the sheet on the sheet stacking tray in the direction perpendicular to the sheet transport direction,
    the system further comprising:
    an acquisition unit that acquires a distance between guide surfaces of the guide members; and
    a warning unit that prompts resetting of the sheet when the distance between the guide surfaces of the guide members is at least a predefined amount greater than a distance between the edges of the sheet.

7. The sheet size specification system of claim 1, wherein a plurality of first markers are disposed in positions on a sheet stacking surface of the sheet stacking tray that can be captured by the image capture unit even when the sheet is on the sheet stacking tray and the sheet is a largest sheet size processable by the image forming device.

8. The sheet size specification system of claim 7, wherein the portable terminal comprises a second prohibiting unit that prevents image capture of the sheet stacking tray by the image capture unit when the plurality of first markers is not entirely within an angle of view of the image capture unit.

9. The sheet size specification system of claim 7, wherein one marker of the plurality of first markers has a different shape and/or color to the other markers of the plurality of first markers, and
    the size specifier determines an orientation of a sheet in an image of the sheet stacking tray captured by the image capture unit, based on a position of the one marker.

10. The sheet size specification system of claim 7, wherein
    a second marker is disposed in a position on the sheet stacking surface of the sheet stacking tray that is (i) covered by the sheet on the sheet stacking tray when the sheet is a specific size and a longitudinal direction of the sheet is parallel to the sheet transport direction and (ii) not covered by the sheet when the sheet is the specific size and the longitudinal direction of the sheet is perpendicular to the sheet transport direction, and
    the size specifier specifies size of the sheet on the sheet stacking tray based on (i) size of the sheet in a direction perpendicular to the sheet transport direction calculated from the first position data and the second position data and (ii) whether or not the second marker is captured in the image data.

11. The sheet size specification system of claim 7, wherein the analyzer includes an image corrector that corrects trapezoidal distortion in an image of the sheet stacking tray captured by the image capture unit, based on positions of the plurality of first markers in the image, and
    the size specifier acquires the first position data and the second position data based on the image data after the correction of trapezoidal distortion.

12. The sheet size specification system of claim 11, wherein
    the portable terminal includes an attitude angle detector that detects an attitude angle of the portable terminal, and
    the image corrector corrects trapezoidal distortion in the image based on the positions of the plurality of first markers in the image and a result of detection by the attitude angle detector.

13. The sheet size specification system of claim 7, wherein
    the size specifier specifies sheet size by using specific points of the plurality of first markers as the predefined feature points.

14. The sheet size specification system of claim 1, wherein
    the portable terminal includes a device data acquirer that acquires device data, the device data including data indicating distances between the predefined feature points of the sheet stacking tray, and the size specifier specifies size of the sheet on the sheet stacking tray based on the device data and a relative positional relationship between the first position data and the second position data.

15. The sheet size specification system of claim 14, wherein
the portable terminal can communicate with the image forming device, and
the device data acquirer acquires the device data from the image forming device.

16. The sheet size specification system of claim 14, wherein
the portable terminal is connected to a server via a network, and
the device data acquirer acquires the device data from the server via the network.

17. The sheet size specification system of claim 14, wherein
a dedicated program for sheet size specification is downloaded to the portable terminal, and
the device data acquirer acquires the device data from data included in the dedicated program.

18. The sheet size specification system of claim 14, wherein
the device data is associated with data indicating a model of the image forming device.

19. The sheet size specification system of claim 1, wherein
the size specifier specifies sheet size by using specific points of the outline of the sheet stacking tray as the predefined feature points.

\* \* \* \* \*